United States Patent
Fusconi et al.

(10) Patent No.: US 12,179,838 B2
(45) Date of Patent: Dec. 31, 2024

(54) CONTROL SYSTEM AND METHOD FOR GENERATING STEERING OVERLAY SIGNAL

(71) Applicant: JAGUAR LAND ROVER LIMITED, Coventry (GB)

(72) Inventors: Denis Fusconi, Coventry (GB); Robyn Caldwell, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 223 days.

(21) Appl. No.: 17/753,587

(22) PCT Filed: Sep. 9, 2020

(86) PCT No.: PCT/EP2020/075231
§ 371 (c)(1),
(2) Date: Mar. 8, 2022

(87) PCT Pub. No.: WO2021/048227
PCT Pub. Date: Mar. 18, 2021

(65) Prior Publication Data
US 2022/0332370 A1  Oct. 20, 2022

(30) Foreign Application Priority Data
Sep. 10, 2019  (GB) ..................... 1913002

(51) Int. Cl.
*B62D 15/02* (2006.01)
*B60W 10/20* (2006.01)
*B60W 30/12* (2020.01)

(52) U.S. Cl.
CPC .......... *B62D 15/025* (2013.01); *B60W 10/20* (2013.01); *B60W 30/12* (2013.01); *B62D 15/029* (2013.01);
(Continued)

(58) Field of Classification Search
CPC ... B62D 15/025; B62D 15/029; B60W 10/20; B60W 30/12; B60W 2552/53; B60W 2510/202; B60W 2710/202
See application file for complete search history.

(56) References Cited

U.S. PATENT DOCUMENTS

| 5,765,116 A | 6/1998 | Wilson-Jones et al. |
| 2009/0216404 A1* | 8/2009 | Maass ................. B62D 15/025 |
| | | 701/41 |

(Continued)

FOREIGN PATENT DOCUMENTS

| JP | 2013139257 A | 7/2013 |
| JP | 2015174478 A | 10/2015 |

(Continued)

OTHER PUBLICATIONS

ISA European Patent Office, International Search Report and Written Opinion Issued in Application No. PCT/EP2020/075231, Nov. 26, 2020, WIPO, 14 pages.

(Continued)

*Primary Examiner* — Stephen Holwerda
(74) *Attorney, Agent, or Firm* — McCoy Russell LLP

(57) ABSTRACT

A control system for controlling generation of a steering wheel overlay signal to control positioning of a host vehicle is configured to determine a first boundary of a lane of travel and a target lane position for the host vehicle in relation to the first boundary, such as a predetermined distance from the first boundary. A steering wheel overlay signal is generated, the steering wheel overlay signal comprising an intra-lane steering signal for steering the host vehicle toward the target lane position. The control system is configured to remove the steering wheel overlay signal in dependence on a velocity of the host vehicle relative to the first boundary being less than a threshold velocity. Thus, the final alignment of the (Continued)

host vehicle achieves the perception of travelling parallel to the boundary, whilst reducing the total intervention time.

14 Claims, 7 Drawing Sheets

(52) U.S. Cl.
 CPC ... *B60W 2510/202* (2013.01); *B60W 2552/53* (2020.02); *B60W 2710/202* (2013.01)

(56) References Cited

U.S. PATENT DOCUMENTS

| | | | |
|---|---|---|---|
| 2010/0191421 A1* | 7/2010 | Nilsson | B62D 6/003 |
| | | | 701/41 |
| 2017/0313309 A1* | 11/2017 | Morales Teraoka | ............ |
| | | | B60W 50/0098 |
| 2018/0170378 A1* | 6/2018 | Oka | B62D 15/025 |

FOREIGN PATENT DOCUMENTS

| | | |
|---|---|---|
| JP | 2017202773 A | 11/2017 |
| WO | 2018025761 A1 | 2/2018 |

OTHER PUBLICATIONS

Great Britain Intellectual Property Office, Combined Search and Examination Report under Sections 17 and 18(3) Issued in Application No. GB2014154.5, Mar. 18, 2021, 5 pages.

* cited by examiner

CONTROL SYSTEM AND METHOD FOR GENERATING STEERING OVERLAY SIGNAL

CROSS REFERENCE TO RELATED APPLICATIONS

The present application is a U.S. National Phase of International Application No. PCT/EP2020/075231 entitled "CONTROL SYSTEM AND METHOD FOR GENERATING STEERING OVERLAY SIGNAL," and filed on Sep. 9, 2020. International Application No. PCT/EP2020/075231 claims priority to Great Britain Patent Application No. 1913002.0 filed on Sep. 10, 2019. The entire contents of each of the above-listed applications are hereby incorporated by reference for all purposes.

TECHNICAL FIELD

The present disclosure relates to the generation of a steering overlay signal. Aspects of the disclosure relate to a control system for generating a steering overlay signal, to a method for generating a steering overlay signal, to a vehicle, to computer software and a non-transitory computer-readable medium.

BACKGROUND

It is known to provide a vehicle, such as an automobile, with a lane keep assist system. Current lane keep assist systems trigger a steering intervention to bring the driver back to a lane without considering the final position or trajectory. The steering torque intervention will conclude when a distance to lane condition is satisfied. This can result in a requirement for a second undesired intervention.

Lengthy steering torque intervention may also be undesirable.

It is an aim of the present disclosure to address one or more of the disadvantages associated with the prior art.

SUMMARY

Aspects and embodiments of the disclosure provide a control system, a control system, a vehicle, a method, computer software and a non-transitory computer-readable medium.

According to an aspect of the present disclosure there is provided a control system for controlling generation of a steering wheel overlay signal to control positioning of a host vehicle, the control system comprising one or more controller, the control system configured to: determine a first boundary of a lane of travel; determine a target lane position for the host vehicle in relation to the first boundary; generate the steering wheel overlay signal, the steering wheel overlay signal comprising an intra-lane steering signal for steering the host vehicle toward the target lane position; and remove the steering wheel overlay signal in dependence on a velocity of the host vehicle relative to the first boundary being less than a threshold velocity. An intra-lane steering signal is applied in order to steer the vehicle to a desirable lateral position and alignment in the lane. Furthermore, the intervention may end when the velocity of the vehicle relative to the first boundary is less than a threshold. Allowing some lateral velocity of the vehicle rather than requiring the vehicle to be placed at a target position and/or alignment enables the intervention to be less intrusive and feel more natural for a driver.

The velocity may be a lateral velocity relative to the first boundary. The lateral velocity may be defined as a component of the host vehicle velocity generally perpendicular to the first boundary. The final alignment of the host vehicle achieves the perception of travelling parallel to the boundary whilst reducing the total intervention time.

The steering wheel overlay signal may be generated to adjust or control a trajectory of the host vehicle. At least in certain embodiments, the steering wheel overlay signal may comprise a lane keep assist function. The lane keep assist function may represent an inter-lane control function. The lane keep assist function may comprise generating the steering wheel overlay signal to maintain the host vehicle in the lane of travel or to return the host vehicle to the lane of travel. The lane keep assist function and the intra-lane steering signal may be performed sequentially. The intra-lane steering signal may be generated after performance of the lane keep assist function. Alternatively, the intra-lane steering signal may be generated as a continuation or an extension of the driver assist control function.

Optionally, the control system is configured to control generation of the steering wheel overlay signal to position the host vehicle at least a predetermined distance from the first boundary, and remove the steering wheel overlay signal in dependence on the host vehicle being positioned at least the predetermined distance from the first boundary and the lateral velocity of the host vehicle relative to the first boundary being less than the threshold velocity. The host vehicle is controlled to at least clear the boundary by a sufficient clearance before the intervention is ended.

The control system may be configured to determine the threshold velocity in dependence on a direction of the velocity of the host vehicle relative to the first boundary. Optionally the control system is configured to determine the threshold velocity to be a first threshold velocity in dependence on the velocity of the host vehicle being directed towards the first boundary and determine the threshold velocity to be a second threshold velocity higher than the first threshold velocity in dependence on the velocity of the host vehicle being directed away from the first boundary. Beneficially, use of such an asymmetric exit criterion improves the user perception of having a heading parallel to the first boundary, and effectively reduces the length of the intervention on curves.

The velocity of the host vehicle being directed towards the first boundary may be defined as a distance between the first boundary and the host vehicle decreasing. The velocity of the host vehicle being directed away from the first boundary may be defined as a distance between first boundary and host vehicle increasing.

Optionally, the control system is configured to determine a principal axis extending substantially parallel to the determined first boundary and determine the target lane position for the host vehicle in dependence on the principal axis. The control system may be configured to control the generation of the steering wheel overlay signal to substantially align the host vehicle with the principal axis. Optionally, the target lane position is on the principal axis. The intra-lane steering signal acts to steer the vehicle within the lane to a target position and alignment, however attainment of the target position and alignment are not required to end the intervention.

Optionally, the control system is configured to determine a second boundary of the lane of travel opposing the first boundary. By opposing, it is meant that the first boundary and second boundary are located on each side of the lane respectively. The second boundary may be defined to be further from the host vehicle than the first boundary. The principal axis may be determined in dependence on one or both of the first and second boundaries. The control system may be configured to control generation of the steering wheel overlay signal to steer the host vehicle towards a mid-point between the first and second boundaries. The host vehicle may be directed to a safe, central position in the lane.

In some embodiments, determining the first boundary of the lane of travel may comprise identifying a road marking or a road edge. Optionally, determining the second boundary of the lane of travel comprises identifying a road marking or a road edge. Both physical boundaries and marked boundaries can be readily detected.

The one or more controllers may collectively comprise at least one electronic processor having an electrical input for receiving a signal from one or more sensors on the host vehicle, and at least one memory device having instructions stored therein may be electrically coupled to the at least one electronic processor. The at least one electronic processor may be configured to access the at least one memory device and execute the instructions thereon so as to generate the steering wheel overlay signal. The at least one electronic processor may be configured to reduce or remove the steering wheel overlay signal in dependence on a velocity of the host vehicle relative to the boundary being less that a threshold velocity.

According to a further aspect of the disclosure, there is provided a vehicle comprising a control system as described above.

According to a further aspect of the disclosure, there is provided a computer-implemented method for controlling generation of a steering wheel overlay signal to control positioning of a host vehicle. The method comprises: determining a first boundary of a lane of travel; determining a target lane position for the host vehicle in relation to the first boundary; generating the steering wheel overlay signal, the steering wheel overlay signal comprising an intra-lane steering signal for steering the host vehicle toward the target lane position; and removing the steering wheel overlay signal in dependence on a velocity of the host vehicle relative to the first boundary being less than a threshold velocity.

According to yet another aspect of the disclosure, there is provided computer software that, when executed, is arranged to perform the above method. According to a further aspect, there is provided a non-transitory computer-readable medium having a set of instructions stored therein which, when executed, cause a processor to perform the above method.

Within the scope of this application it is expressly intended that the various aspects, embodiments, examples and alternatives set out in the preceding paragraphs, in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

DETAILED DESCRIPTION

A control system 1 in accordance with an embodiment of the present disclosure will now be described with reference to the accompanying figures. The control system 1 is installed in a vehicle 2, referred to herein as a host vehicle 2. The host vehicle 2 in the present embodiment is an automobile, such as a wheeled vehicle, but it will be understood that the control system 1 may be used in other types of land vehicle. The host vehicle 2 is described herein with reference to a reference frame comprising a longitudinal axis X, a transverse axis Y and a vertical axis Z. The host vehicle 2 has a longitudinal centreline CL extending along the longitudinal axis X.

Figure 1:
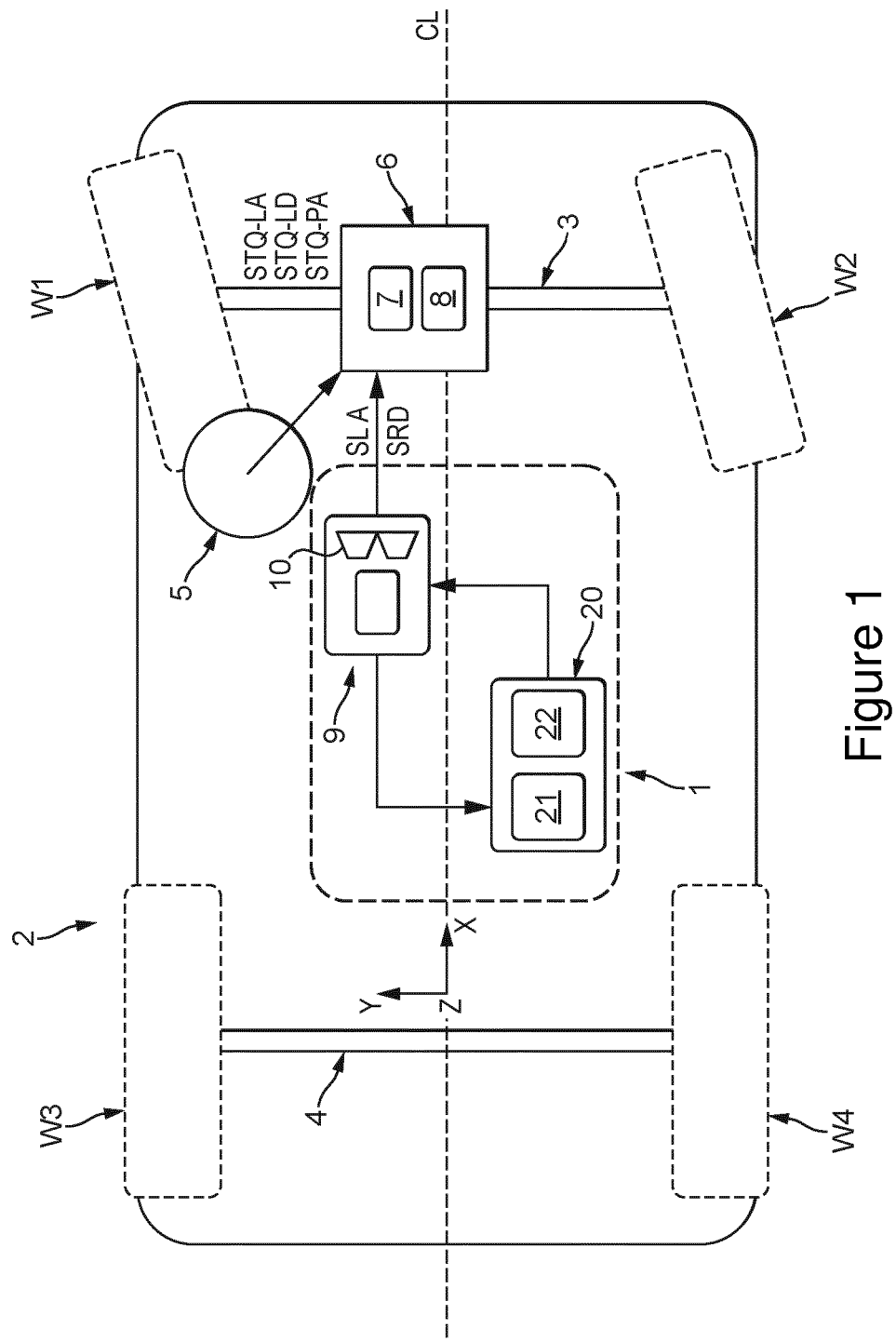
FIG. 1 shows a schematic representation of a host vehicle incorporating a control system in accordance with an embodiment of the present disclosure.

As illustrated in FIG. 1, the host vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the host vehicle 2. A driver-operated steering wheel 5 is provided for controlling a steering angle $\alpha$ of the first and second wheels W1, W2 is provided on the front axle 3.

A power assist steering system 6 is provided to generate a steering assist torque STQ-PA to supplement a steering torque applied to the steering wheel 5 by the driver. The power assist steering system 6 comprises a power assist steering controller 7; a torque sensor (not shown) for sensing the steering torque applied by the driver to the steering wheel 5; and a power assist steering actuator 8 for generating the steering assist torque STQ-PA. In the present embodiment, the power assist steering system 6 is an electric power assist steering system (EPAS) comprising an electromechanical actuator operable to generate the steering assist torque. Other types of power assist steering actuator 7 may be used, such as a hydraulic actuator.

The control system 1 comprises a lane departure warning system 9 for identifying when the host vehicle 2 is departing the host vehicle lane of travel LT-n (i.e. the current lane in which the host vehicle 2 is travelling). As described herein, the lane departure warning system 9 is also suitable for identifying when the host vehicle 2 is approaching or traversing a physical limit or a boundary of the road R on which the host vehicle 2 is travelling. The physical limit or boundary of the road R is referred to herein as a road edge RE. The lane departure warning system 9 is configured to output a lane departure signal SLD upon determining that the host vehicle 2 is departing or at risk of departing the host-vehicle lane of travel LT-n or approaching or traversing the road edge RE.

The power assist steering system 6 is configured to implement a lane keep assist (LKA) function for maintaining or returning the host vehicle 2 to the lane of travel LT-n. The control system 1 is configured to control the power assist steering system 6 to generate a lane assist steering overlay STQ-LD in dependence on the lane departure signal SLD. The lane assist steering overlay STQ-LD in the present embodiment comprises or consists of a lane assist steering torque STQ-LD. The lane assist steering torque STQ-LD is applied as a steering wheel torque overlay to the steering assist torque STQ-PA generated by the power assist steering system 6. The lane assist steering torque STQ-LD acts to steer the host vehicle 2 to return to the lane of travel LT-n or avoid departing from the lane of travel LT-n.

Further to maintaining or returning the host vehicle 2 in the lane of travel, the control system 1 may be configured to continue the intervention to steer the host vehicle to a target position in the lane of travel LT. The lane departure warning system 9 is configured to output an intra-lane signal SLA comprising a target position and/or target trajectory $\alpha_T$ of the host vehicle 2 in the host-vehicle lane of travel LT. The control system 1 is then configured to control the power assist steering system 6 to generate an intra-lane steering signal STQ-LA in dependence on the intra-lane signal SLD. The intra-lane steering signal STQ-LA in the present embodiment comprises or consists of an intra-lane steering torque STQ-LA. The steering torque request may comprise a torque request direction (+ve or −ve) and optionally also a torque request magnitude.

The lane departure warning system 9 comprises a sensor unit 10 and may comprise an image processing module 11. The sensor unit 10 in the present embodiment comprises an optical camera having a field of view extending forwards in front of the host vehicle 2. The sensor unit 10 may comprise one or more optical cameras, for example a stereo camera. Alternatively, or in addition, the lane departure warning system 9 may utilise other types of sensor, such as a radar system or a LIDAR system, to capture a representation of a region in front of the host vehicle 2. The sensor unit 10 in the present embodiment is located behind a rear-view mirror (not shown) provided at the top of the front windshield. Other mounting locations are possible, for example the sensor unit 10 may be provided behind or in a front grille of the host vehicle 2. The lane departure warning system 9 may optionally receive inputs from one or more vehicle systems, for example to determine if the driver has activated side indicators to signal an intended change the lane of travel LT. The lane departure warning system 9 may be configured to inhibit output of the lane departure signal SLD, for example if the driver activates the directional (side) indicators. The image processing module 11 receives image data captured by the sensor unit 10. The image data is processed to identify features of the road R on which the host vehicle 2 is travelling. The image data is also processed to detect the road edge RE, for example by identifying a transition or boundary between a road surface which may be relatively smooth (for example defined by asphalt, concrete or other surfacing material) and an adjacent surface which may be relatively rough (for example composed of one or more of the following: grass, mud, gravel, sand and snow).

Figure 2:
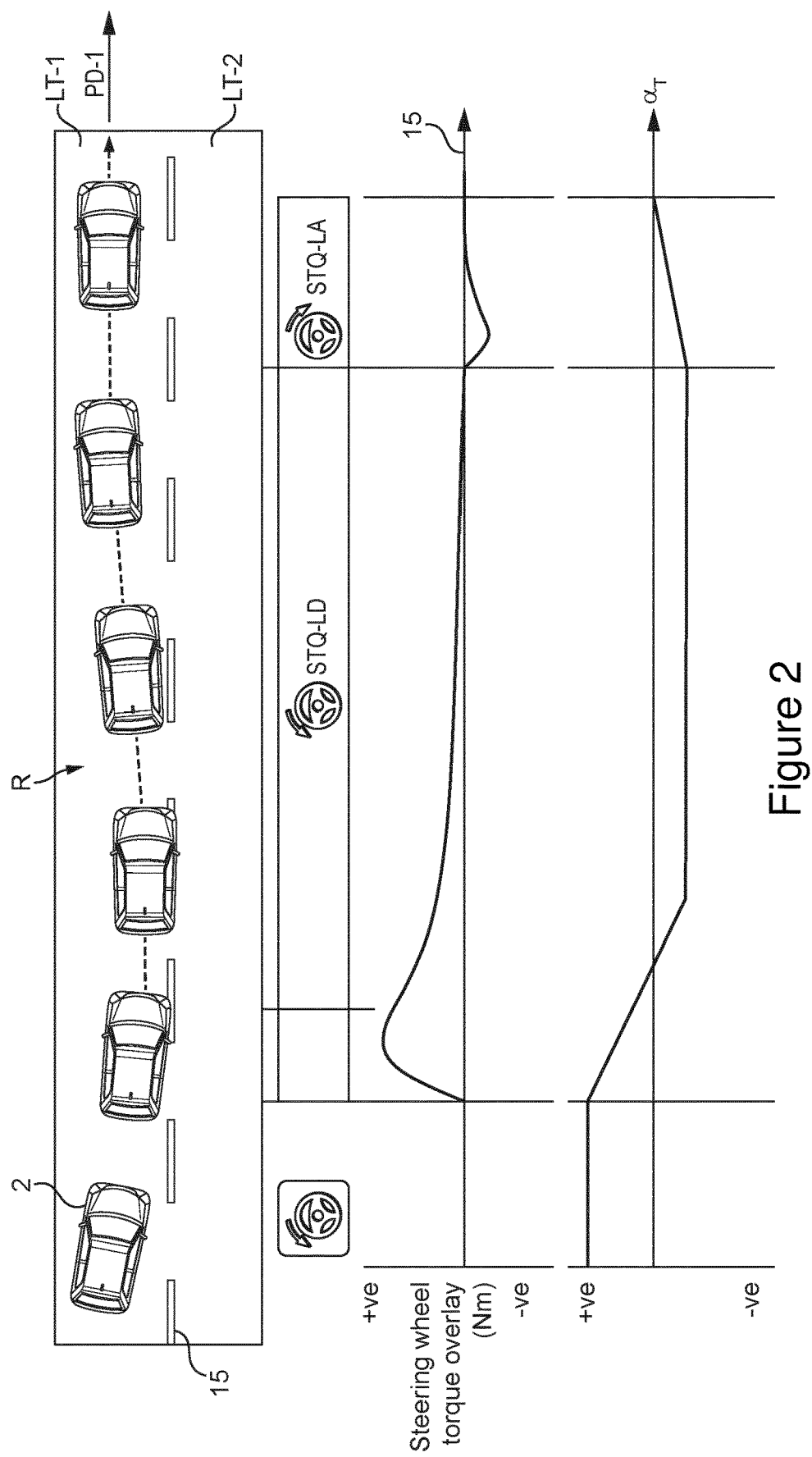
FIG. 2 illustrates generation of a lane keep assist torque and an intra-lane torque by the control system.

As illustrated in FIG. 2, the power assist steering system 6 is operable to implement a steering overlay intervention. The steering overlay intervention comprises a sequence of the lane keep assist function and the intra-lane function.

In use, the power assist steering system 6 may be controlled to generate a lane assist steering torque STQ-LD when the lane departure warning system 9 determines that the host vehicle 2 is departing a lane of travel LT-n. The power assist steering system 6 may then be controlled to generate an intra-lane steering torque STQ-LA to be applied after the lane assist steering torque STQ-LD. The intra-lane steering torque STQ-LA may, for example, be applied in dependence on a determination that the host vehicle 2 has returned to the host-vehicle lane of travel LT-n.

The lane assist steering torque STQ-LD and the intra-lane steering torque STQ-LA are transmitted to the steering wheel 5 to provide a haptic signal to the driver of the host vehicle 2. The lane assist steering torque STQ-LD and the intra-lane steering torque STQ-LA are output to the steering wheel 5 in an appropriate direction to maintain the host vehicle 2 in the host-vehicle lane of travel LT-n. The magnitude of the lane assist steering torque STQ-LD and the intra-lane steering torque STQ-LA are controlled such that, if necessary, the driver can override the lane assist steering torque STQ-LD or the intra-lane steering torque STQ-LA, for example to implement a change in trajectory of the host vehicle 2 to implement a planned change in the lane of travel LT-n. The lane assist steering torque STQ-LD and the intra-lane steering torque STQ-LA may, for example, each have a maximum value of 3 Nm although other maximum values may be selected as appropriate.

Figure 3A:
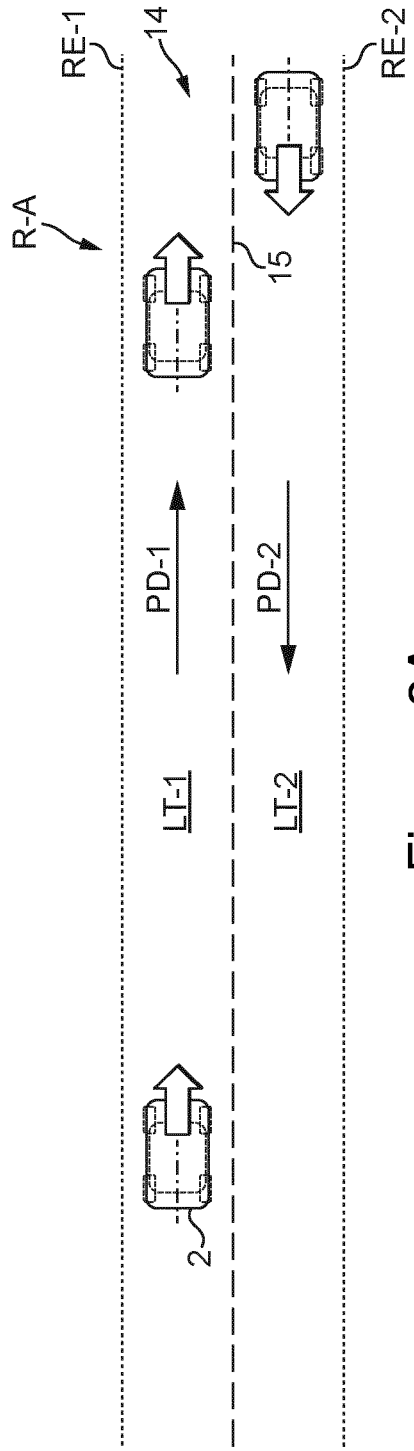
FIG. 3A illustrates the host vehicle travelling on a first section of road having a single lane of travel in each direction.
Figure 3B:
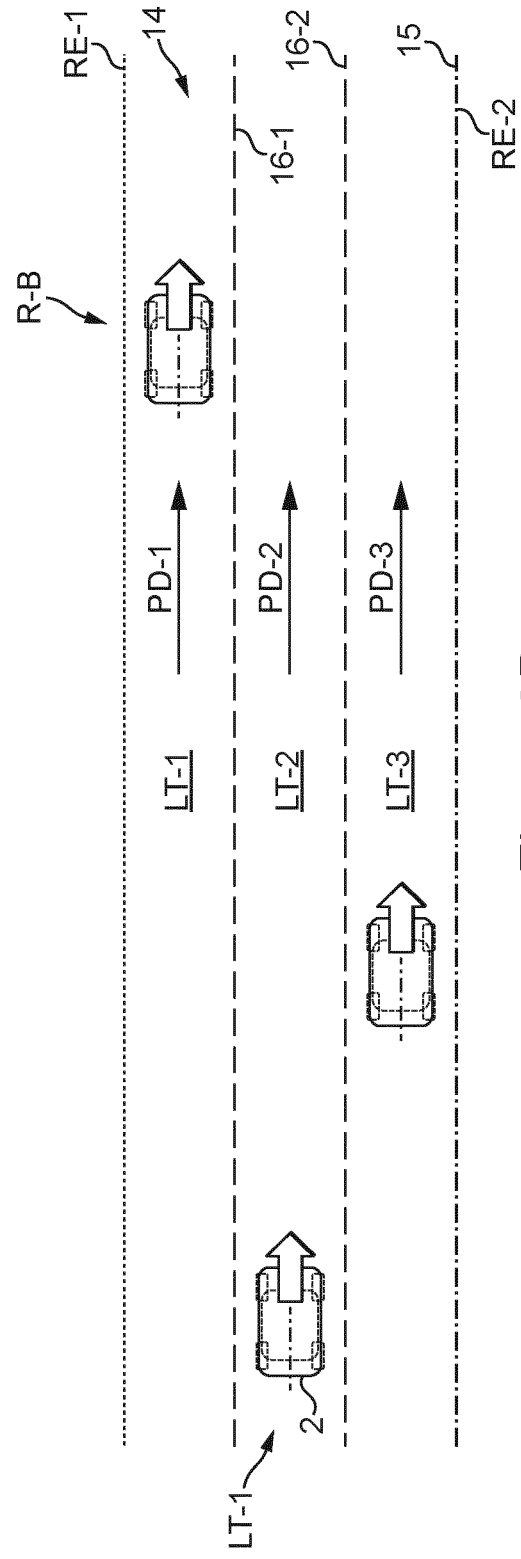
FIG. 3B illustrates the host vehicle travelling on a second section of road having a plurality of lanes of travel in each direction.

The control system 1 can be implemented when the host vehicle 2 is travelling on a road R having one or more lanes of travel LT-n. By way of example, a first road section R-A is shown in FIG. 3A; and a second road section R-B is shown in FIG. 3B.

The first and second road sections R-A, R-B can form part of the same road R or may be separate roads R. The first road section R-A is a two-lane road (also known as a "two-lane highway") having first and second lanes of travel LT-1, LT-2 for vehicles travelling in respective first and second directions. The second road section R-B consists of a multiple-lane road (also known as a "multiple-lane highway") having a two or more lane of travel LT-n for vehicles travelling in the same direction. It will be understood that the present disclosure is not limited to operation on roads having the features illustrated in the first and second road sections R-A, R-B. The first and second road sections R-A, R-B each comprise first and second road edges RE-1, RE-2. In the illustrated example, the first and second road edges RE-1, RE-2 mark the lateral extent of the metalled road surface. It will be understood that one or both of the first and second road edges RE-1, RE-2 may comprise a barrier or partition member, for example separating lanes of a dual carriageway (also known as a "divided highway"). The first and second road sections R-A, R-B may also comprise road markings (denoted herein generally by the reference numeral 14). The first road section R-A has road markings 14 comprising a central road marking 15. As shown in FIG. 3B, the central road marking 15 comprises a centre line of the second road section R-B. The road markings 14 on the second road section R-B comprise one or more lane markings 16-$n$ representing a boundary of a lane of travel LT-n for vehicles travelling in the same direction or in opposite directions. The one or more lane markings 16-$n$ may comprise lane lines. In the illustrated arrangement, the second road section R-B comprises first and second lane markings 16-1, 16-2 for demarcating first, second and third lanes of travel LT-1, LT-2, LT-3. The central road marking 15 and/or the one or more lane marking(s) 16-n may each comprise a continuous line (not shown) or an interrupted line (shown in FIGS. 3A and 3B). The road marking(s) 14 may each comprise one line or multiple lines, for example in the form of a single line or a double line. The central road marking 15 typically differentiates between sections of the first or second road section R-A, R-B intended for travel in opposite directions. Alternatively, or in addition, the road marking(s) 14 may comprise edge lines to indicate an edge of an inboard lane; the edge lines may be separated from the associated first or second road edge RE-1, RE-2. The first road section R-A shown in FIG. 3A includes central road markings 15 and lane markings defining a plurality of lanes of travel LT-n.

The lane departure warning system 9 is operable to monitor the image data captured by the sensor unit 10 at least substantially in real time. The image processing module 11 analyses the image data to identify the first road edge RE-1 and/or the second road edge RE-2. The image processing module 11 may, for example, identify changes in the contrast and/or colour of the image data which may be indicative of the first and/or second road edge RE-1, RE-2. Other image processing techniques may be used to identify the first and second road edges RE-1, RE-2. The image processing module 11 is configured also to identify any road markings 14 present on the road R. The image processing module 11 may, for example, utilise image processing techniques to identify continuous or interrupted lines extending in a forward direction (i.e. parallel to the centre line CL of the host vehicle 2). The image processing module 11 is configured to identify the central road markings 15 and the lane markings 16. If road markings 14 are identified, the image processing module 11 identifies the lane of travel LT-n in which the host vehicle 2 is currently travelling (referred to herein as the host-vehicle lane of travel LT-n).

The image processing module 11 is configured to determine a principal axis PD of the lane of travel LT-n in which the host vehicle 2 is currently travelling. The principal axis PD represents a principal direction of travel for vehicles travelling in the lane of travel LT-n. The principal axis PD may be determined in dependence on one or more of the following: the first road edge RE-1, the second road edge RE-2, and the road marking(s) 14. The principal axis PD may, for example, be identified as a direction extending substantially parallel to the road edge RE-n, a central road marking 15 or a lane marking 16. The principal axis PD may be identified as a direction extending substantially parallel to a boundary of the lane of the travel LT-n which is closest to the host vehicle 2, for example closest to the centre line CL of the host vehicle 2). Alternatively, or in addition, the principal axis PD may be determined with reference to two or more features identified in the image data. For example, the principal axis PD may be determined as corresponding to a virtual centreline extending between a first road edge RE-1 and a central road marking 15; or a virtual centreline extending between first and second lane markings 16-1, 16-2. Alternatively, the principal axis PD may be offset from and extend parallel to a virtual centreline of the road R or the lane of travel LT-n. The image processing module 11 may optionally determine a centreline of the or each lane of travel LT-n. Alternatively, or in addition, the principal axis PD may be predefined, for example in map data.

The lane departure warning system 9 identifies the road marking 14 or road edge RE-1, RE-2 closest to the longitudinal centreline CL of the host vehicle 2. If the host vehicle 2 approaches or crosses the identified road marking 14 or road edge RE-1, RE-2, the lane departure warning system 9 determines that the host vehicle 2 is departing from the host-vehicle lane of travel LT-n. The lane departure warning system 9 then outputs the lane departure signal SLD. The lane departure signal SLD includes an indication of whether the host vehicle 2 is traversing the lane markings or road edge on a right-hand side or a left-hand side of the host vehicle 2. The power assist steering system 6 receives the lane departure signal SLD and is operable to generate the lane assist steering torque STQ-LD in a direction suitable for maintaining the host vehicle 2 in the host-vehicle lane of travel LT-n.

Following application of the lane assist steering torque STQ-LD, the lane departure warning system 9 may output the intra-lane signal SLA. The power assist steering system 6 may then be controlled to generate the intra-lane steering torque STQ-LA to control the host vehicle 2 to a target position within the lane of travel LT-n (i.e. at a target lane position).

The intra-lane steering torque STQ-LA can be generated as a separate control function which is implemented upon completion of the lane assist steering torque STQ-LD, for example as a continuation of this function. In a variant, the intra-lane steering torque STQ-LA may be integrated into the lane assist steering torque STQ-LD.

The intra-lane steering torque STQ-LA may be generated to position the host vehicle 2 at least a predetermined distance D1 from a boundary of the lane of travel LT-n. The predetermined distance D1 may be defined relative to the centreline CL of the host vehicle 2 or relative to the side of the host vehicle 2 closest to the identified boundary. The boundary may, for example, correspond to the first or second road edge RE-1, RE-2 or a road marking 14. By way of example, the predetermined distance D1 is shown in relation to a first road edge RE-1 in the scenario illustrated in FIG. 4. Alternatively, the control system 1 may generate the intra-lane steering torque STQ-LA to position the host vehicle 2 centrally within the lane of travel LT-n. The intra-lane steering torque STQ-LA may be configured to position the host vehicle 2 at a mid-point between the first and second lane markings 16-1, 16-2 which define opposing sides of the lane of travel LT-n.

Figure 4:
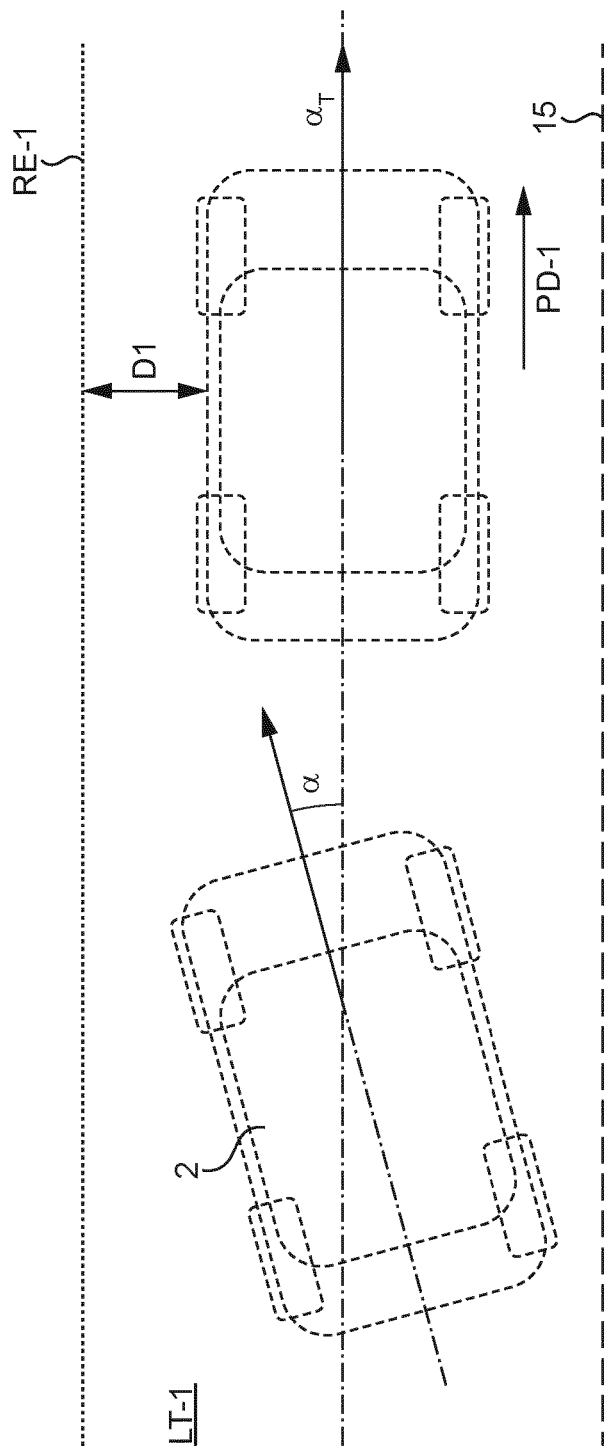
FIG. 4 illustrates the position and trajectory of the target vehicle in a lane of travel.

At least in certain embodiments, this may facilitate the transition to the scenario in which the host vehicle 2 is controlled exclusively by the driver. The intra-lane function is implemented by a steering wheel torque overlay comprising an intra-lane steering torque STQ-LA applied to the steering assist torque STQ-PA. In the arrangement illustrated in FIG. 2, the control system 1 is configured to generate the intra-lane steering torque STQ-LA following application of the lane assist steering torque STQ-LD. The intra-lane steering torque STQ-LA is generated to control the host vehicle 2 at least substantially to position the host vehicle 2 at a predefined position within the lane of travel LT-n. In the present embodiment, the intra-lane steering torque STQ-LA is also generated to control the host vehicle 2 at least substantially to align a trajectory $\alpha$ (or orientation) of the host vehicle 2 with a target trajectory $\alpha_T$. A target position and a target orientation for the host vehicle 2 are represented in FIG. 4 by a dashed (phantom) representation of the host vehicle 2. The target trajectory $\alpha_T$ in the present embodiment is substantially parallel to the principal axis PD of the lane of travel LT-n. The intra-lane steering torque STQ-LA is transmitted to the steering wheel 5 and provides a haptic signal to the driver. The intra-lane steering torque STQ-LA is output to the steering wheel 5 in an appropriate direction to control the trajectory $\alpha$ of the host vehicle 2 at least substantially to match the target trajectory $\alpha_T$. The intra-lane steering torque STQ-LA is generated in dependence on a comparison of a current trajectory α of the host vehicle 2 in relation to the principal axis PD.

To facilitate the transition to the host vehicle 2 being controlled by the driver, the control system 1 is configured to reduce or remove the magnitude of the intra-lane steering torque STQ-LA such that the steering wheel overlay is eventually removed. The condition for removal of the intra-lane steering torque STQ-LA may be such that the target trajectory $α_T$ of the host vehicle need not be completely attained, such that the total intervention length is shortened.

The control system 1 may be configured to monitor a velocity of the host vehicle 2 relative to the identified boundary RE-1 or the centreline CL of the host vehicle 2. That is, the control system 1 may be configured to monitor a lateral velocity of the host vehicle 2. During the intervention, when the lateral velocity of the host vehicle drops below a threshold, the control system 1 is configured to reduce or remove the intra-lane steering torque STQ-LA. The threshold may be set for example between 0.05 m/s and 0.5 m/s. For example, the threshold may be 0.09 m/s. A low lateral velocity provides the effective feeling to the driver that the host vehicle 2 is heading substantially parallel to the lane boundary, transitioning control to the driver with the host vehicle 2 in an appropriate state. Using lateral velocity in place of a target alignment or target position criterion for ending the intervention enables the intervention to be ended more quickly whilst still leaving the vehicle in a safe and natural state for driving. This is because target alignment and position criteria may prove more difficult to meet than a lateral velocity criterion, such as in curved roads where following a curve boundary exactly parallel is challenging. Minimising the length of the intervention reduces the intrusiveness of the lane keep assist system.

The threshold velocity may be asymmetrically determined in some embodiments. The control system 1 is then configured to determine the threshold velocity in dependence on a direction of the velocity of the host vehicle 2 relative to the identified boundary. The identified boundary may be taken to mean the boundary to which the host vehicle 2 approached in order for the lane departure warning system 9 to trigger an intervention.

Figure 5A:
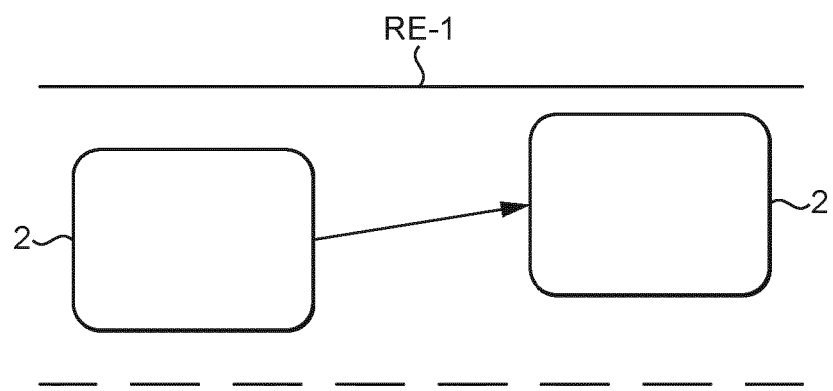
FIG. 5A illustrates the host vehicle having a lateral velocity in a first direction.
Figure 5B:
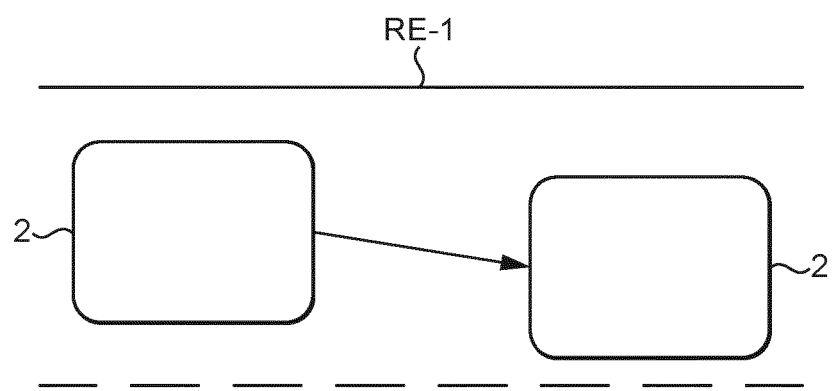
FIG. 5B illustrates the host vehicle having a lateral velocity in a second direction.

FIGS. 5A and 5B illustrate the host vehicle 2 having a lateral velocity in two different directions. In FIG. 5A, the host vehicle has a lateral velocity directed towards the identified boundary RE-1, in that the distance between the host vehicle 2 and the identified boundary RE-1 is converging. In FIG. 5B, the host vehicle has a lateral velocity directed away from the identified boundary RE-1, in that the distance between the host vehicle and the identified boundary RE-1 is diverging. In the illustrated embodiment, the threshold velocity is determined to be a first threshold velocity when the velocity of the host vehicle is directed towards the identified boundary, as in FIG. 5A. The threshold velocity is determined to be a second threshold velocity higher than the first threshold velocity when the velocity of the host vehicle is directed away from the identified boundary, as in FIG. 5B. For example, the first threshold velocity may be 0.09 m/s and the second threshold velocity may be 0.2 m/s. Such an asymmetric lateral velocity threshold may allow the intervention to be ended sooner when the direction of travel of the vehicle is away from the boundary, i.e. towards lane center. However, also allowing some lateral velocity towards the lane boundary may more accurately emulate a natural driving style and reduce driver inconvenience, such as when the intervention is triggered on a curved road where some lateral velocity towards the boundary may be natural.

Figure 6:
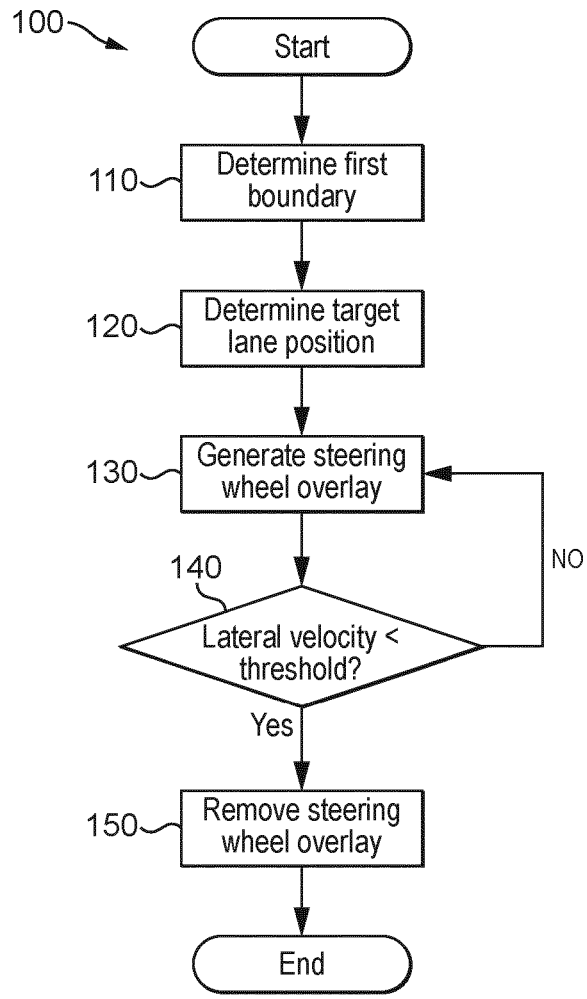
FIG. 6 shows a block diagram illustrating a method according to an embodiment of the present disclosure.

A method 100 representing operation of the control system 1 according to an embodiment of the disclosure is shown in FIG. 6.

At block 110, the method 100 comprises determining a first boundary of a lane of travel. The first boundary may be determined as the road marking 14 or road edge RE-n closest to the longitudinal centreline CL of the host vehicle, as described. In the steering overlay intervention illustrated by FIG. 2, the first boundary comprises the central road markings 15. The first boundary may be determined during the course of the lane departure warning system 9 determining that the host vehicle 2 approaches or crosses the first boundary 15.

At block 120, the method 100 comprises determining a target lane position for the host vehicle 2 in relation to the first boundary. Optionally, block 120 may comprise determining a target trajectory $α_T$ for the host vehicle 2 in the lane of travel. The target lane position may for example be determined to be centred in the lane, or a predetermined distance from the first boundary. A target lane position that may be determined at block 120 according to an embodiment of the disclosure is illustrated in FIG. 4. In FIG. 4, the target lane position may be considered to be a target trajectory $α_T$ substantially aligned with the principal axis PD of the lane, and a predetermined distance D1 from the road edge RE-1.

At block 130, the method comprises generating a steering wheel overlay signal. The steering wheel overlay signal as illustrated in FIG. 2 comprises an intra-lane steering signal STQ-LA for steering the host vehicle toward the target lane position. The steering wheel overlay signal may also comprise a lane assist steering signal STQ-LD for maintaining or returning the host vehicle 2 to the lane of travel. The two components STQ-LD, STQ-LA of the steering wheel overlay signal may be implemented together, as has been described. FIG. 2 illustrates the two components STQ-LD, STQ-LA being implemented sequentially, although it will be appreciated that the lane assist steering signal STQ-LD and the intra-lane steering signal STQ-LA may be integrated together as one steering wheel overlay signal.

At block 140, the method comprises determining whether a lateral velocity of the host vehicle 2 in the lane of travel is less than a threshold lateral velocity. The threshold lateral velocity may in some embodiments be asymmetrically defined depending on the direction of the lateral velocity, as described with reference to FIG. 5. If the lateral velocity of the vehicle is below the threshold lateral velocity, the method 100 proceeds to block 150. If the lateral velocity of the vehicle is above the threshold lateral velocity, the method 100 returns to block 130 and the steering wheel overlay signal is maintained. Optionally, block 140 may further comprise checking that one or more further conditions are met before proceeding to block 150. In some embodiments, block 140 may further comprise determining whether the host vehicle 2 is positioned at least a predetermined distance from the first boundary, to ensure an adequate clearance has been attained. The method 100 may then proceed to block 150 when the host vehicle 2 is positioned at least the predetermined distance from the first boundary and the lateral velocity of the host vehicle is below the threshold. At block 150, the steering wheel overlay signal is reduced to zero (0) or removed, to transition control of the vehicle back to the driver.

The method 100 may be triggered by the lane departure system 9 at any time when the host vehicle 2 is travelling and approaches or crosses a lane boundary.

Figure 7:
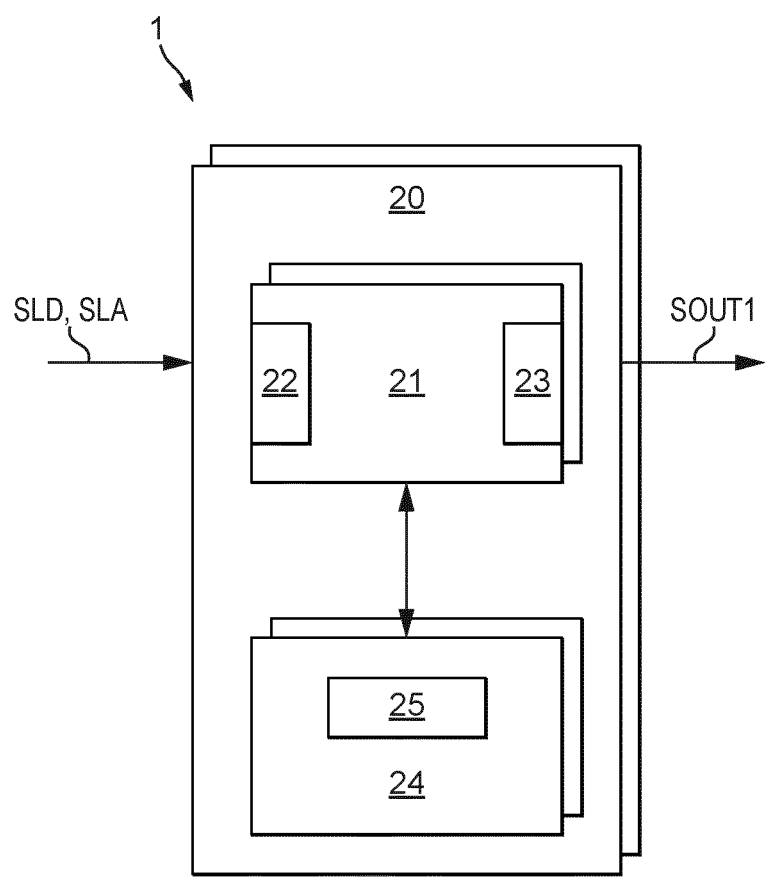
FIG. 7 is a schematic representation of the control system in accordance with an embodiment of the present disclosure.

With reference to FIG. 7, there is illustrated a simplified example of a control system 1 such as may be adapted to implement a method according to an embodiment of the disclosure as described herein. The control system 1 comprises one or more controllers 20 and is configured to control generation of a steering wheel overlay signal to control steering of a host vehicle 2. The control system 1 includes one or more controllers 20 and is configured to determine a first boundary of a lane of travel LT-n. The control system 1 determines a target position for the host vehicle 2 in relation to the first boundary. The control system 1 generates the steering wheel overlay signal which includes an intra-lane steering signal STQ-LA steering the host vehicle toward the target lane position. The control system 1 removes the steering wheel overlay signal in dependence on a velocity of the host vehicle relative to the first boundary being less than a threshold velocity.

It is to be understood that the or each controller 20 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 20 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 20 to implement the control techniques described herein (including some or all of the functionality required for the method described herein). The set of instructions could be embedded in said one or more electronic processors of the controller 20; or alternatively, the set of instructions could be provided as software to be executed in the controller 20. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 7, the or each controller 20 comprises at least one electronic processor 21 having one or more electrical input(s) 22 for receiving one or more input signals SLD, SLA, and one or more electrical output(s) 23 for outputting one or more output signals SOUT1. The or each controller 20 further comprises at least one memory device 24 electrically coupled to the at least one electronic processor 21 and having instructions 25 stored therein. The at least one electronic processor 21 is configured to access the at least one memory device 24 and execute the instructions 25 thereon.

The, or each, electronic processor 21 may comprise any suitable electronic processor (e.g., a microprocessor, a microcontroller, an ASIC, etc.) that is configured to execute electronic instructions. The, or each, electronic memory device 24 may comprise any suitable memory device and may store a variety of data, information, threshold value(s), lookup tables or other data structures, and/or instructions therein or thereon. In an embodiment, the memory device 24 has information and instructions for software, firmware, programs, algorithms, scripts, applications, etc. stored therein or thereon that may govern all or part of the methodology described herein. The processor, or each, electronic processor 21 may access the memory device 24 and execute and/or use that or those instructions and information to carry out or perform some or all of the functionality and methodology describe herein.

The at least one memory device 24 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 20 have been described comprising at least one electronic processor 21 configured to execute electronic instructions stored within at least one memory device 24, which when executed causes the electronic processor(s) 21 to carry out the method as hereinbefore described. However, it is contemplated that the present disclosure is not limited to being implemented by way of programmable processing devices, and that at least some of, and in some embodiments all of, the functionality and or method steps of the present disclosure may equally be implemented by way of non-programmable hardware, such as by way of non-programmable ASIC, Boolean logic circuitry, etc.

It will be appreciated that various changes and modifications can be made to the present disclosure without departing from the scope of the present application.

The invention claimed is:

1. A control system for controlling generation of a steering wheel overlay signal to control positioning of a host vehicle, the control system comprising one or more controller, the control system configured to:
   determine a first boundary of a lane of travel;
   determine a target lane position for the host vehicle in relation to the first boundary;
   generate the steering wheel overlay signal, the steering wheel overlay signal comprising an intra-lane steering signal for steering the host vehicle toward the target lane position; and
   remove the steering wheel overlay signal in dependence on a lateral velocity of the host vehicle relative to the first boundary dropping to be less than a threshold velocity, wherein the control system is configured to determine the threshold velocity in dependence on a direction of the velocity of the host vehicle relative to the first boundary.

2. The control system as claimed in claim 1, wherein the control system is configured to:
   control generation of the steering wheel overlay signal to steer the host vehicle to at least a predetermined distance from the first boundary, and
   remove the steering wheel overlay signal in dependence on the host vehicle being positioned at least the predetermined distance from the first boundary and the velocity of the host vehicle relative to the first boundary being less than the threshold velocity.

3. The control system as claimed in claim 1, wherein the control system is configured to determine the threshold velocity to be a first threshold velocity in dependence on the velocity of the host vehicle being directed towards the first boundary, and determine the threshold velocity to be a second threshold velocity higher than the first threshold velocity in dependence on the velocity of the host vehicle being directed away from the first boundary.

4. The control system as claimed in claim 1, configured to determine a principal axis extending substantially parallel to the determined first boundary and determine the target lane position for the host vehicle in dependence on the principal axis.

5. The control system as claimed in claim 4, wherein the control system is configured to control the generation of the steering wheel overlay signal to substantially align the host vehicle with the principal axis.

6. The control system as claimed in claim 1, wherein the control system is configured to determine a second boundary of the lane of travel opposing the first boundary.

7. The control system as claimed in claim 6, wherein the control system is configured to control generation of the steering wheel overlay signal to steer the host vehicle towards a mid-point between the first and second boundaries.

8. The control system as claimed in claim 1, wherein determining the first boundary of the lane of travel comprises identifying a road marking or a road edge.

9. The control system as claimed in claim 1, wherein the steering wheel overlay signal comprises a lane assist steering overlay for maintaining the host vehicle within the lane of travel.

10. The control system as claimed in claim 9, wherein the steering wheel overlay signal comprises a lane assist steering overlay for maintaining the host vehicle within the lane of travel.

11. A vehicle comprising the control system as claimed in claim 1.

12. A computer-implemented method for controlling generation of a steering wheel overlay signal to control positioning of a host vehicle, the method comprising:

determining a first boundary of a lane of travel;

determining a target lane position for the host vehicle in relation to the first boundary;

generating the steering wheel overlay signal, the steering wheel overlay signal comprising an intra-lane steering signal for steering the host vehicle toward the target lane position;

determining a threshold velocity in dependence on a direction of a velocity of the host vehicle relative to the first boundary; and removing the steering wheel overlay signal in dependence on a lateral velocity of the host vehicle relative to the first boundary dropping to be less than the threshold velocity.

13. A computer that, when executed, is arranged to perform the method according to claim 12.

14. A non-transitory computer-readable medium having a set of instructions stored therein which, when executed, cause a processor to perform the method according to claim 12.

* * * * *